United States Patent

[11] 3,589,027

| [72] | Inventors | Cleo Duzan;<br>Max Miller, both of Oakland, Ill. |
|---|---|---|
| [21] | Appl. No. | 774,334 |
| [22] | Filed | Nov. 8, 1968 |
| [45] | Patented | June 29, 1971 |
| [73] | Assignees | Royal Industries, Inc.<br>Pasadena, Calif. ;<br>Farm Fans, Inc.<br>Indianapolis, Ind. |

[54] APPARATUS FOR DRYING
2 Claims, 3 Drawing Figs.

| [52] | U.S. Cl. | 34/57 |
|---|---|---|
| [51] | Int. Cl. | F26b 3/10 |
| [50] | Field of Search | 34/57, 10 |

[56] References Cited
UNITED STATES PATENTS

| 1,213,962 | 1/1917 | Siler | 34/57 T UX |
| 2,231,342 | 2/1941 | Loyless | 34/57 T |
| 3,304,619 | 2/1967 | Futer | 34/10 |

FOREIGN PATENTS

| 218,025 | 8/1958 | Australia | 34/57 |
| 1,293,023 | 4/1962 | France | 34/57 T |

Primary Examiner—Frederick L. Matteson
Assistant Examiner—Robert A. Dua
Attorney—Christie, Parker & Hale ABSTRACT: A drying unit for crops like corn, wheat, rice and the like constructed as a compartment having a drying chamber and a plenum chamber. The drying chamber is constructed inwardly of the outer walls of the compartment with perforated walls to pass the heated air from the plenum chamber. The crops to be dried are received at one end of the drying chamber and carried therethrough by the action of the heated air which functions to fluidize and suspend the crops for conveying them in a wavelike fashion through the drying compartment. The plenum chamber receives the heated air supplied by means of a fan and heater mounted in the compartment adjacent the plenum chamber. The heated air from the plenum chamber also functioning to preheat the crops temporarily stored in the drying chamber to be operated on by the stream of hot air.

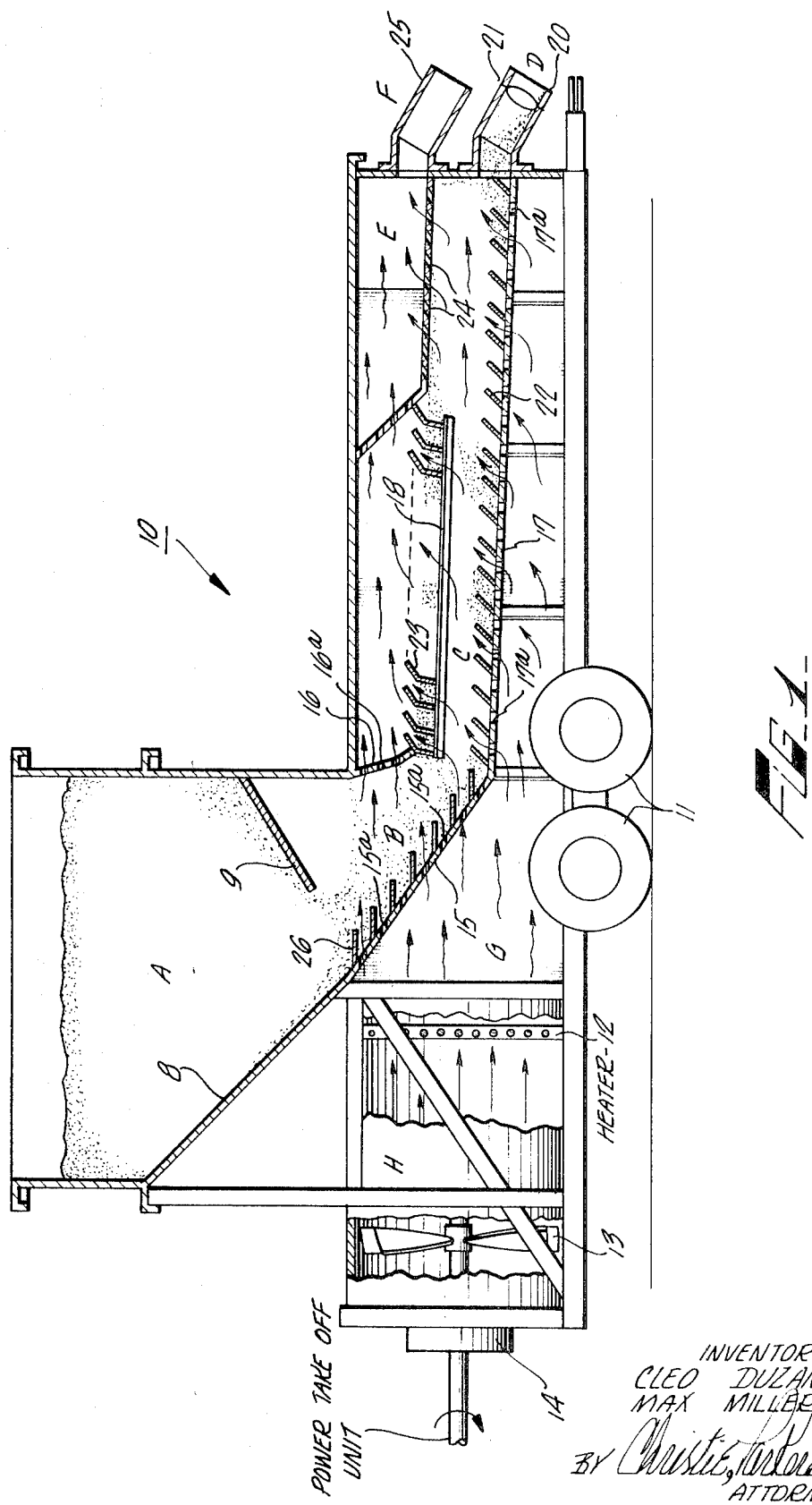

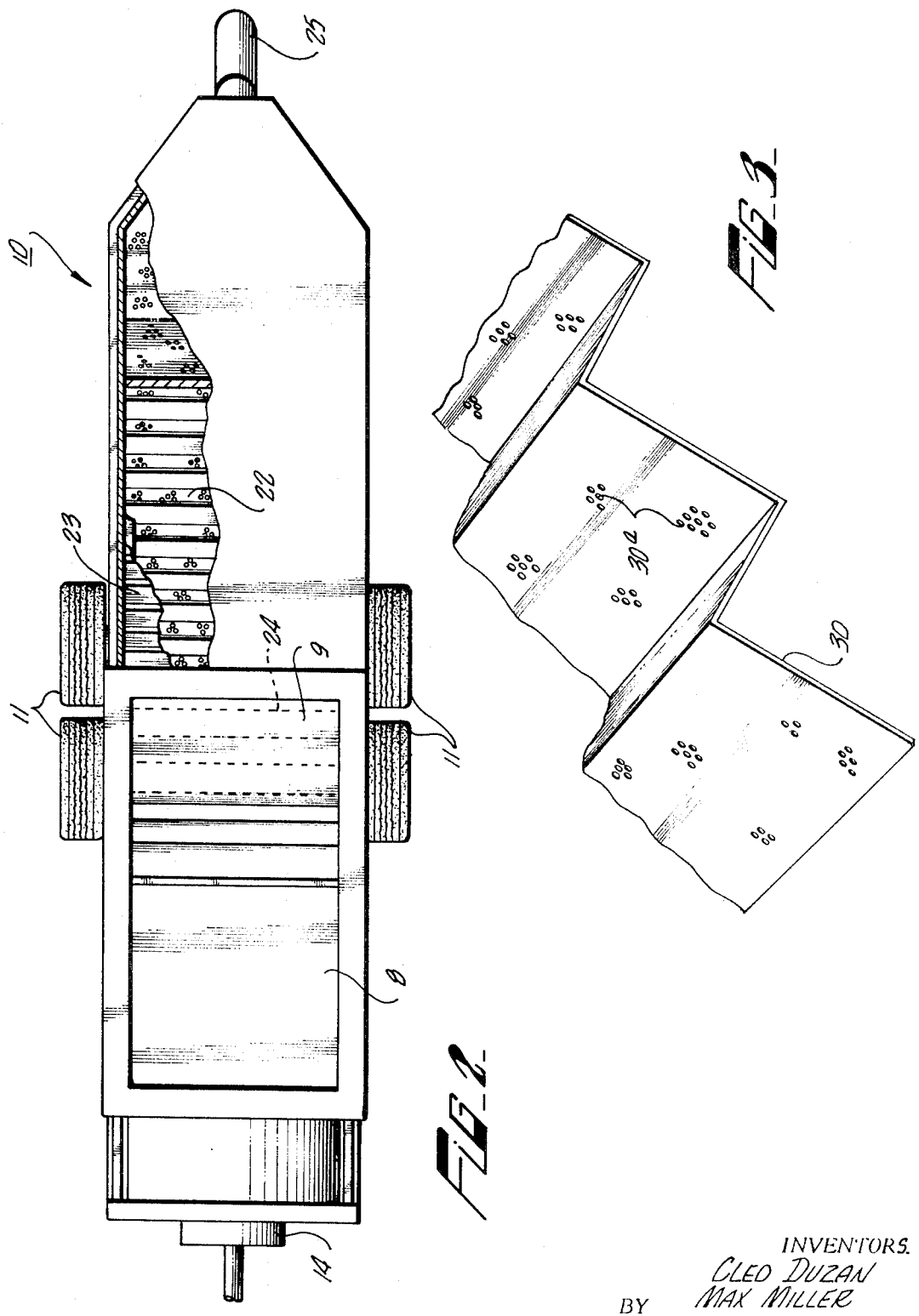

APPARATUS FOR DRYING

This invention relates to apparatus for drying, and more particularly to portable apparatus for drying crops such as corn, wheat, rice, and the like.

At the present time, there are many types of drying apparatus commercially available for removing the moisture from crops such as corn, wheat, rice, and the like. In general, most of these drying apparatus require that the crops be dried in some fashion while in storage at some point away from the field where the crop is harvested. The drying apparatus generally employs heated air passed through the stored crops in one manner or another for drying purposes. Due to the large bulk of the crops in storage and the lack of movement of the crops during the drying period, these prior art drying processes require a relatively long period of time and are relatively expensive. In addition, some of these prior art drying techniques mechanically agitate the crops to facilitate the drying process thereby causing damage thereto and thereby reducing the value of the crop to the farmer. One of the important features of any drying apparatus is the ability of drying the crop without mechanical damage thereto. For example, in the drying of grain, the grain should not be subjected to temperatures that cause stresses in the grain or fracture the kernels or mechanical handling producing damage to the kernels.

At the present time there is no convenient portable means available to the farmer for drying his crops in the fields. The provision of such a portable drying apparatus would allow the farmer to perform the drying operations himself and reduce the amount of handling of the crops which tend to reduce the profitability of the crops to the farmer. Accordingly, there is a present need for an inexpensive portable drying apparatus for field use.

The present invention provides an improved apparatus for drying crops in the field that is relatively inexpensive and removes the moisture from the crops without any mechanical damage thereto. The apparatus of the present invention does not cause the crop to be raised to such a high temperature that it will become mechanically fractured and thereby reduce the value of the yield to the farmer. The apparatus does not employ any moving parts, and the entire drying, conveying, and cleaning operations produced by the drying apparatus result from subjecting the crops to the continuous flow of a drying gas to fluidize the crops and suspend them in the gas stream, thereby completely subjecting the crops to the drying gas and causing the drying thereof without any mechanical fractures or stresses. The grain is also conveyed or mechanically handled by the drying gas, thereby further eliminating any possibility of mechanical damage to the crops. The heated, dried crops may then be conveyed to conventional aerated storage to remove the additional moisture in the crops, which additional moisture can be removed by slow cooling procedures.

The apparatus of the present invention has been advantageously employed in the field to remove approximately 20 percent of the moisture from corn that initially had approximately 37 percent of moisture therein, which corn having such a high percentage of moisture is considered by the farmer to be extremely wet. The corn which was discharged from the drying apparatus of the present invention was discharged at 270 bushels per hour without any mechanical fracture of the corn as a result of being subjected to the drying apparatus.

From a structural standpoint, the drying unit of the present invention comprises a substantially L-shaped drying compartment having elongated perforated walls arranged therein for defining a drying chamber and a hopper communicating with the chamber for loading the drying chamber with the materials to be dried. Means are mounted in the compartment for passing a heated gas through the drying chamber to cause the material stored therein to become fluidized and completely subjected to the drying gas while continuously conveying the material through the drying chamber in response to the passage of the gas through the chamber in a surgelike fashion.

These and other features of the present invention may be more fully appreciated when considered in the light of the following specifications and drawings, in which:

FIG. 1 is a cross-sectional view of the drying apparatus of the present invention with a material to be dried diagrammatically illustrated;

FIG. 2 is a top plan view, with portions broken away, of the drying apparatus of FIG. 1 without any material stored therein; and FIG. 3 is a partial view of an alternate construction of the perforated walls of the drying apparatus of FIG. 1 and FIG. 2.

The present invention is adapted to drying crops such as corn, wheat, rice, peanuts in the shell, and similar materials or crops. The only limitation of the types of materials or crops to be dried with the present invention is that the material, crop, or the like be of sufficient weight to enable it to be fluidized without being blown out of the drying chamber when subjected to the drying gas. To facilitate the description of the present invention, the material or the crop to be dried will be described in terms of grain or corn. It should be recognized that perfect grain is grain that does not exhibit any mechanical fractures or stresses, and therefore any drying method or apparatus is evaluated on the basis of whether or not it will produce any cracks or stresses in the grain either in the heating or cooling procedures. The present invention merely provides the heating procedure for removing a substantial amount of moisture from the grain, and relies on conventional aerating bins that most farmers have available at the present time for the cooling procedure. Since this cooling procedure is not critical with respect to time, the grain can be cooled over a relatively long period and thereby further avoid introduction of any stresses or cracks into the grain.

The drying apparatus 10 comprises an L-shaped boxlike structure mounted on wheels 11 for ready transportation from place to place in the field. The boxlike structure comprising drying apparatus 10 can be considered to be constructed of a plurality of sections and/or chambers. The sections or chambers are identified by the letters A through H. The section A is the wet grain-holding bin or hopper. A drying chamber comprising a preheating area B and a drying section C communicates with the hopper or holding bin A and discharges the dried grain at the grain discharge section D. In addition to the drying procedure, the drying apparatus 10 cleans foreign material from the crops during the drying process and such cleaning section is identified by the letter E. The foreign materials, or "fines," are discharged through a discharge outlet F. A hot drying gas or air is passed into the preheating section B and the drying section C of the drying chamber from the plenum chamber G. The hot air or drying gas is derived from the section H which includes a heater 12 and fan 13. The fan 13 may be coupled to a conventional power takeoff unit 14 that may be driven from a farm tractor to power the fan.

The wet grain-holding bin or hopper A is constructed and defined in one arm of the L-shaped boxlike structure defining the drying apparatus 10. The discharge end of the holding bin A has a reduced opening for gravity feeding the grain into the drying chamber and in particular to the preheating area B. For this purpose, an internal wall 8 and a baffle 9 are arranged at approximately a 45° angle with the outer walls of the drying apparatus, as best illustrated in FIG. 1.

The drying chamber comprises the preheating area B and the drying section C and is constructed and defined by perforated walls. The perforated walls defining the preheating section B are identified by the reference numerals 15 and 16. The walls 15 and 16 are angularly related to walls 17 and 18 defining the elongated drying section C of the drying chamber and communicate with the discharge end of the hopper or storage bin A. The walls 17 and 18 are arranged in a substantially parallel relationship to one another and are slightly downwardly inclined relative to the boxlike structure proper, as illustrated. The walls 17 and 18 communicate directly with the discharge outlet which may be defined by a pipe 20 mounting a controllable discharge valve 21 at the grain discharge end of the chamber C or at the discharge section D. The walls 17 and 18 are illustrated with a plurality of longitudinally spaced-apart baffles similar to the baffles 22 mounted to extend into the drying section C. The baffles 22 are preferably angularly related with respect to the wall 17 to directionalize the drying gas or air admitted into the drying section C. Air is admitted into the drying chamber by means of a plurality of apertures in the walls 15 and 17. The apertures are identified by the reference characters 15a and 17a in the respective walls 15 and 17. The apertures 17a may also be angularly defined for admitting the air in the desired direction for conveying the air and thereby the grain toward the discharge section D of the drying chamber. The perforated wall 18 is also provided with a plurality of baffles 23 arranged exteriorly of the drying section C for diverting the air passing out of the drying section C towards the cleaning section E. The cleaning section E is defined by the perforated wall 24 which may be a screen or a screenlike construction.

In a similar fashion, a plurality of longitudinally spaced-apart baffles 26 are provided for the perforated wall 15 for defining the preheating section B. The baffles 26, however, are mounted in a spaced-apart parallel relationship for guiding the air admitted thereto and in a substantially parallel relationship with the axis of the drying section C. In this fashion, then, any grain stored in section B will have a parallel flow of air passing therethrough and exiting through apertures 16a provided in the wall 16. The air exiting from the preheating section B also passes into the cleaning section E. The cleaning section E is also provided with a pipe 25 functioning as fine material or foreign material discharge conduit F. The "fines" mixed in with the grain are separated by the drying gas and are carried onto the perforated wall 24 and blown out of the discharge pipe 25 into the atmosphere.

The plenum chamber G through which the hot drying gas is delivered to the drying chamber is defined outside of the drying chamber by means of the outer walls of the boxlike structure of the drying apparatus 10 and the perforated walls 15 and 17. The construction of the plenum chamber G is such as to allow the hot drying gas supplied thereto to be admitted to the preheating section B and the drying section C substantially along its entire length by means of the apertures 15a and 17a.

The remaining section H of the drying apparatus 10 provides the hot drying gas by means of a heater 12 and the fan 13. The heater 12, which may be a conventional butane burner, is stored on the boxlike structure 10 proper immediately adjacent the plenum chamber G and storage bin A, as illustrated. The air to be heated by means of the heater 12 is received from the fan 13 mounted immediately outside one of the outer walls of the drying apparatus 10, or the left-hand wall as illustrated in FIG. 1. The fan 13 blows the atmospheric air into the heater 12 at a preselected pressure and velocity for providing the desired fluidizing action on the grain in the drying apparatus 10. In a practical embodiment, fan 13 comprises a 44-inch duct axial fan operating in the range of 1,600 to 1,750 revolutions per minute. The air received from the fan is heated to provide an air temperature in the plenum chamber G on the order of 225 Fahrenheit. The pressure of the air delivered to the drying chamber is on the order of 5 to 7 inches of static pressure as measured in the plenum chamber G. This air temperature will maintain the grain at a temperature of approximately 160° Fahrenheit and will remove the moisture therefrom without any mechanical damage.

Although the drying section C has been described hereinabove as defined with the baffles 22, it should be recognized that the directivity to the heated air may be provided without such baffles or louvers. For this purpose, a ruffled wall similar to the wall 30 illustrated in FIG. 3 may be provided. The wall 30 is perforated by means of a series of perforations 30a and can be appreciated as providing the desired directional action to the drying gas in much the same fashion as baffles 22.

With the above structure in mind, the operation of the drying apparatus 10 will now be examined. When it is desired to employ the drying apparatus 10, the discharge valve 21 is maintained in a closed condition. The wet grain is then loaded into the drying apparatus 10 into bin A and the grain will be stored therein substantially as shown in FIG. 1. The heater 12 and the fan 13 are then placed in an operative condition to subject the grain in the drying apparatus 10 to the hot drying gas. The initial load in the drying apparatus 10 and in particular the grain in the drying section C is dried simply by subjecting the grain to the hot air or gas passed through the drying section C. After the initial drying interval, the control valve 21 is operated to allow the dried grain to be discharged through the conduit D. It should be recognized that during this initial drying interval the hot gas acting on the grain functions to fluidize the grain in a fashion to suspend the kernels of the grain completely in air and thereby dry the grain without any mechanical fracture or stress. The opening of the discharge valve 21 is effective for producing a surging action in the grain such as to cause it to flow or be conveyed out of the drying apparatus as a result of the fluidization of the grain. During the intervals that the discharge valve 21 is open, the fluidized grain is suspended in the hot air and is mixed to this wavelike fashion as it travels toward the control valve 21. This fluidization and mixing action on the grain allows all of the grain to be subjected over its entire surface to the drying gas. With the continual discharge of the grain at the discharge outlet D, the voids in the grain are successively filled by the adjacent kernels causing the voids to progress toward the hopper or storage bin B. This, then, causes the grain stored in bin A to be gravity fed into the preheating section B and thereafter into the drying section C in a continuous fashion until the bin A is empty.

It should be recognized that the grain stored in the preheating section B is momentarily stationary relative to the grain in the drying section C and during this interval the hot air passed through the walls 15 and 16 preheats the grain and partially fluidizes it prior to entry into the drying section C. The grain conveyed into drying section C is subjected to the directionalized drying air which acts to not only suspend it into the air, but convey it toward the discharge section D. The time required for the grain to travel, then, from bin A to drying section C to discharge section D is of a sufficient period of time to provide the desired drying action on the grain. During this interval any foreign material or "fines" are carried by the air stream into the cleaning section E and blown out the discharge conduit 25.

We claim:

1. A drying unit for crops like corn, wheat, rice, and the like comprising
   a substantially L-shaped boxlike compartment constructed and defined with a drying chamber and a plenum chamber,
   a plurality of perforated walls arranged in a spaced-apart relationship for defining an elongated drying chamber arranged within one arm of the L-shaped box and spaced inwardly of the outer walls of the compartment, one end of the chamber communicating with the atmosphere,
   means constructed and defined with the walls for the drying chamber and angularly oriented towards the one end of the chamber for diverting air passed through the chamber to the atmosphere,
   perforated walls defining the material entry end of the drying chamber and arranged in an inclined relationship to receive and temporarily store material to be dried,
   the other arm of the boxlike compartment constructed and defined as a hopper for storing and delivering crops to be dried, the discharge end of the hopper being of a reduced opening and communicating with the material entry end of the drying chamber to provide gravity flow of the crops,
   a discharge valve mounted adjacent to the end of the drying chamber communicating with the atmosphere,
   heating means mounted in said compartment adjacent the plenum chamber for heating air delivered thereto and passing the heated air to the plenum chamber, and fan means mounted adjacent the heating means and supplying air to the heating means, the heated air passed through the latter mentioned perforated walls functioning to preheat the crops temporarily stored in the enclosed section of the drying chamber, the heated air passing through the elongated section of the drying chamber functioning to fluidize and suspend the crops to subject them completely to the drying air and convey them in a wavelike fashion towards the discharge valve.

2. A drying unit as defined in claim 1 including means for separating the foreign material from the crops being dried.